US012800834B2

(12) United States Patent
Todd

(10) Patent No.: US 12,800,834 B2
(45) Date of Patent: Nov. 17, 2026

(54) OPTICAL PROCESSING SYSTEM

(71) Applicant: Optalysys Limited, Leeds (GB)

(72) Inventor: Robert James Todd, South Yorkshire (GB)

(73) Assignee: Optalysys Ltd., Leeds (GB)

( * ) Notice: Subject to any disclaimer, the term of this patent is extended or adjusted under 35 U.S.C. 154(b) by 224 days.

(21) Appl. No.: 18/044,156

(22) PCT Filed: Sep. 6, 2021

(86) PCT No.: PCT/GB2021/052289

§ 371 (c)(1),
(2) Date: Mar. 6, 2023

(87) PCT Pub. No.: WO2022/049394

PCT Pub. Date: Mar. 10, 2022

(65) Prior Publication Data

US 2023/0375784 A1 Nov. 23, 2023

(30) Foreign Application Priority Data

Sep. 7, 2020 (GB) ...................................... 2014043

(51) Int. Cl.

*G02B 6/26* (2006.01)
*G02B 6/04* (2006.01)
*G06E 3/00* (2006.01)

(52) U.S. Cl.

CPC ............... *G02B 6/262* (2013.01); *G02B 6/04* (2013.01); *G06E 3/003* (2013.01)

(58) Field of Classification Search

None
See application file for complete search history.

(56) References Cited

U.S. PATENT DOCUMENTS

| | | | | |
|---|---|---|---|---|
| 4,531,195 | A | 7/1985 | Lee | |
| 10,289,151 | B2 | 5/2019 | New | |
| 10,409,084 | B2 | 9/2019 | New et al. | |
| 10,564,363 | B1 * | 2/2020 | Corl | ........................ G02B 6/262 |

(Continued)

FOREIGN PATENT DOCUMENTS

| | | | |
|---|---|---|---|
| EP | 1420322 | A2 | 5/2004 |
| EP | 1546838 | A1 | 6/2005 |

(Continued)

OTHER PUBLICATIONS

Combined Search and Examination Report for British Application No. GB2014043.0, dated Mar. 1, 2021.

(Continued)

*Primary Examiner* — Chad H Smith

(74) *Attorney, Agent, or Firm* — Potomac Law Group, PLLC; Reza Mollaaghababa; Reza Sadr

(57) ABSTRACT

An optical processing system comprises a first integrated optical waveguide array; a first bundle of optical fibres; the optical fibres being coupled to the first integrated optical waveguide array by a first coupler; the optical fibres being further coupled to an optical Fourier stage; a second bundle of optical fibres being coupled to the optical Fourier stage; a second integrated optical waveguide array; and a second coupler for coupling the second bundle of optical fibres to the second integrated optical waveguide array.

19 Claims, 14 Drawing Sheets

(56) References Cited

U.S. PATENT DOCUMENTS

| | | | |
|---|---|---|---|
| 2013/0209112 | A1 | 8/2013 | Witzens |
| 2020/0073054 | A1 | 3/2020 | Yang et al. |
| 2020/0255401 | A1 | 8/2020 | Angibaud et al. |

FOREIGN PATENT DOCUMENTS

| | | | |
|---|---|---|---|
| JP | 5525063 | A | 2/1980 |
| WO | 2018167316 | A1 | 9/2018 |
| WO | 2019207317 | A1 | 10/2019 |
| WO | 2020245436 | A1 | 12/2020 |

OTHER PUBLICATIONS

Crossland et al., “Beam steering optical switches using LCOS: The ‘ROSES’ demonstrator”, Feb. 2000.

International Preliminary Report on Patentability for International Application No. PCT/GB2021/052289, dated Mar. 7, 2023.

International Search Report and Written Opinon for International Application No. PBT/GB2021/052289, dated Dec. 12, 2021.

* cited by examiner

OPTICAL PROCESSING SYSTEM

TECHNICAL FIELD

Certain embodiments of the invention pertain to optical processing systems.

BACKGROUND AND PRIOR ART KNOWN TO THE APPLICANT

The closest prior art may be found in the Applicant's own prior published patent applications. The following are provided by way of example only:

EP1420322;
WO2018167316;
EP1546838;
U.S. Pat. No. 10,289,151;
U.S. Pat. No. 10,409,084;
WO02019207317;
PCT/EP2020/065740.

SUMMARY OF THE INVENTION

In a broad independent aspect, the invention provides an optical processing system comprising:

- a first integrated optical waveguide array;
- a first bundle of optical fibres; said optical fibres being coupled to said first integrated optical waveguide array by a first coupler; said optical fibres being further coupled to an optical Fourier stage;
- a second bundle of optical fibres being coupled to said optical Fourier stage;
- a second integrated optical waveguide array; and a second coupler for coupling said second bundle of optical fibres to said second integrated optical waveguide array.

Optical processing systems of the kind in question may be particularly advantageous as they allow, in certain embodiments, for greater flexibility of configuration. In particular, the optical processing capacity may be adjusted by expanding the number of modules and/or arrays and/or optical components to improve performance and optionally improve integration into other systems. This system may in certain embodiments facilitate the increase of the yield and scalability of an optical processing system by coupling optical waveguides to a free space Fourier optical stage using an optical fibre bundle, in a modular approach. In certain embodiments, the system is configured so that the fibres can route waveguide outputs to any selected pixel in a 2D array. The particular pixel may be arbitrary and may for example allow a dead pixel to be replaced by another pixel in the array. This therefore allows for greater configurability by allowing the routing to be adapted to the operating requirements which therefore provides a significant yield benefit. This configuration provides, in certain embodiments, a further advantage over using a grating coupler array on silicon by reducing the optical losses and improving the optical output of the pixel/data points.

In a subsidiary aspect, at least one of said integrated optical waveguide arrays comprises an array of couplers which are grating couplers. This configuration is particularly advantageous for coupling integrated optical waveguide arrays with fibre bundles.

In a further subsidiary aspect, at least one of the integrated optical waveguide arrays comprises an array of couplers which are endfire couplers. This configuration is particularly advantageous for coupling integrated optical waveguide arrays with fibre bundles.

In a further subsidiary aspect, both the first and second integrated optical waveguide arrays comprise grating couplers.

In a further subsidiary aspect, both the first and second integrated optical waveguide arrays comprise endfire couplers.

In a further subsidiary aspect, at least one of said integrated optical waveguide arrays comprises an array of couplers which are grating couplers whilst at least one of the optical waveguide arrays comprises an array of couplers which are endfire couplers.

In a further subsidiary aspect, the system comprises a plurality of integrated optical waveguide arrays acting as disparate modules for input into the system. This provides for greater flexibility of configuration for the input side of the optical processing system.

In a further subsidiary aspect, the system comprises a plurality of integrated optical waveguide arrays acting as disparate modules for output from the system. This provides for greater flexibility of configuration for the output side of the optical processing system.

In a further subsidiary aspect, the optical fibre bundles are coupled to the optical Fourier stage by a microlens array. This is particularly advantageous for inserting into free space optics. In certain embodiments, the microlens array may be a 2D array in other embodiments the microlens array may be a 3D array.

In a further subsidiary aspect, the microlens array comprises one or more of the following: square microlens, circular microlens, and/or hexagonal microlens.

In a further subsidiary aspect, the microlens array has one or more of the following: square microlenses on an orthogonal array, circular microlenses on an orthogonal array, circular microlenses on a honeycomb array, and/or hexagonal microlenses on a honeycomb array.

In a further subsidiary aspect, the optical Fourier stage is a free space optical Fourier stage.

In a further subsidiary aspect, the optical Fourier stage comprises a solid glass single module. This configuration is particularly advantageous as it allows for greater modularity of the system.

In a further subsidiary aspect, the system comprises a plurality of 1D integrated optical waveguide arrays which couple into an optical fibre bundle which terminates into either a 2D or 3D array of microlenses. This optional configuration is particularly advantageous as it allows the modular scalability of the system.

In a further subsidiary aspect, each of the integrated optical waveguide arrays, the optical fibre bundles, and the optical Fourier stage are formed as disparate modules.

DETAILED DESCRIPTION OF THE FIGURES

Figure 1:
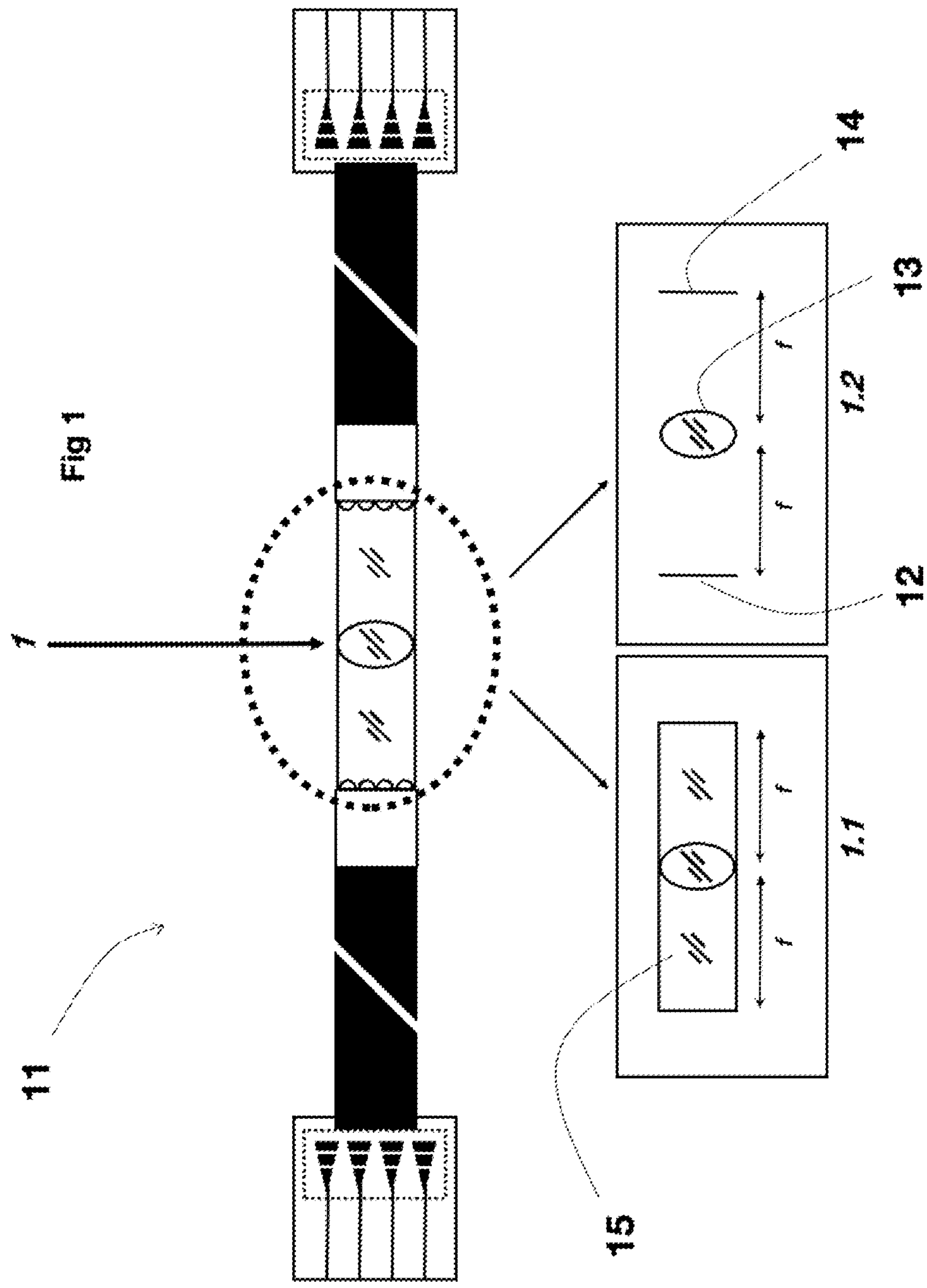
FIG. 1 shows a schematic plan view of an optical processing system with detailed views 1.1 and 1.2 of the optical Fourier transform assemblies.

FIG. 1 shows an optical processing system, generally referenced 11, which has at its heart an optical Fourier transform assembly 1. Whilst optical Fourier transform assemblies are well known from the patent applications cited in the background section, certain embodiments of the invention envisage free space optics with fluid or a vacuum separating respective input array, output array and lens as shown in detailed view 1.2. The lens 13, and the respective input and output arrays 12 and 14 are separated by a distance f corresponding to the focal length of the lens.

In a preferred embodiment, a solid glass optical Fourier transform assembly is envisaged as shown in detailed view 1.1. In this configuration, the solid glass optical Fourier transform assembly, forms a module 15 or mono-block 15.

Figure 2:
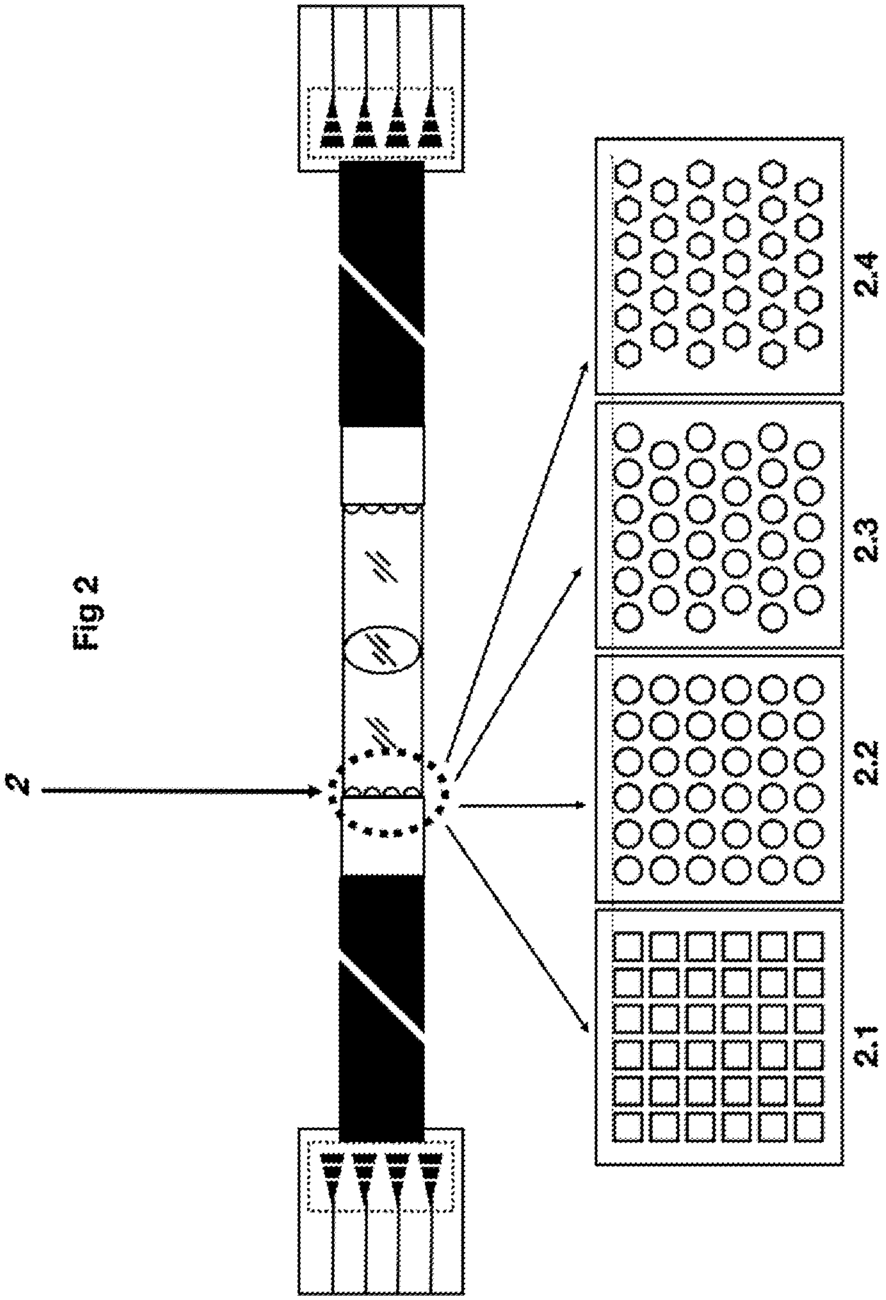
FIG. 2 shows a schematic plan view of the optical processing system of FIG. 1 with detailed views of lens arrays 2.1 to 2.4.

The input into this module will now be described with reference to FIG. 2. It shows a plurality of optional input microlens arrays 2.1., 2.2., 2.3., and 2.4. Microlens array 2.1 comprises square microlenses on an orthogonal array. Microlens array 2.2 comprises circular microlenses on an orthogonal array. Microlens 2.3 comprises circular microlenses on a honeycomb array. Microlens array 2.4 comprises hexagonal microlenses on a honeycomb array. In certain preferred embodiments, the microlens arrays are formed as a 2-D array. In other embodiments, the microlens arrays may be formed as a 1-D array. In further embodiments, the microlens array may be formed as a 3D array.

Figure 3:
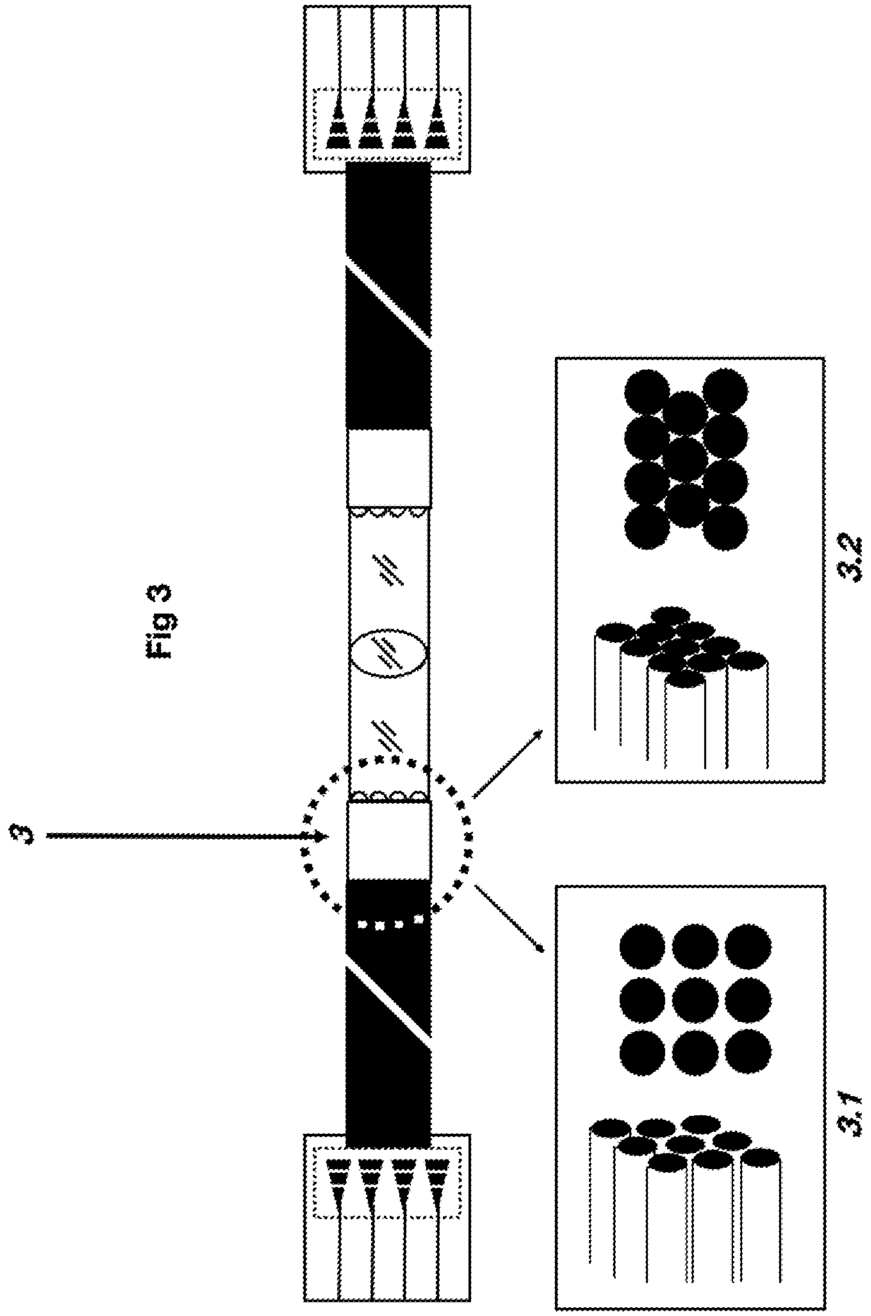
FIG. 3 shows a schematic plan view of the optical processing system of FIG. 1 with detailed views of fibre bundle configurations 3.1 and 3.2.

The microlens arrays provide a coupling into the solid glass optical Fourier transform assembly for fibre bundles as provided and illustrated in FIG. 3. Fibre optic bundle array 3 may be provided in a plurality of configurations as shown in detailed views 3.1. and 3.2. where respectively a square arrangement fibre bundle is shown (view 3.1.) and a hexagonal arrangement fibre bundle (view 3.2.). As can be seen, the hexagonal arrangement fibre bundle allows for a closer configuration of fibres compared to the square arrangement fibre bundle. These fibre bundles may be provided advantageously as modules for extra flexibility of integration into the optical system. In preferred embodiments, the optical lenses are closely contiguous. In further preferred embodiments, the optical lenses are present throughout the array covering both a central region of the array and a perimeter region of the array. In further preferred embodiments, optical fibres are provided on the optical axis of the Fourier system or in close proximity thereto.

Figure 4:
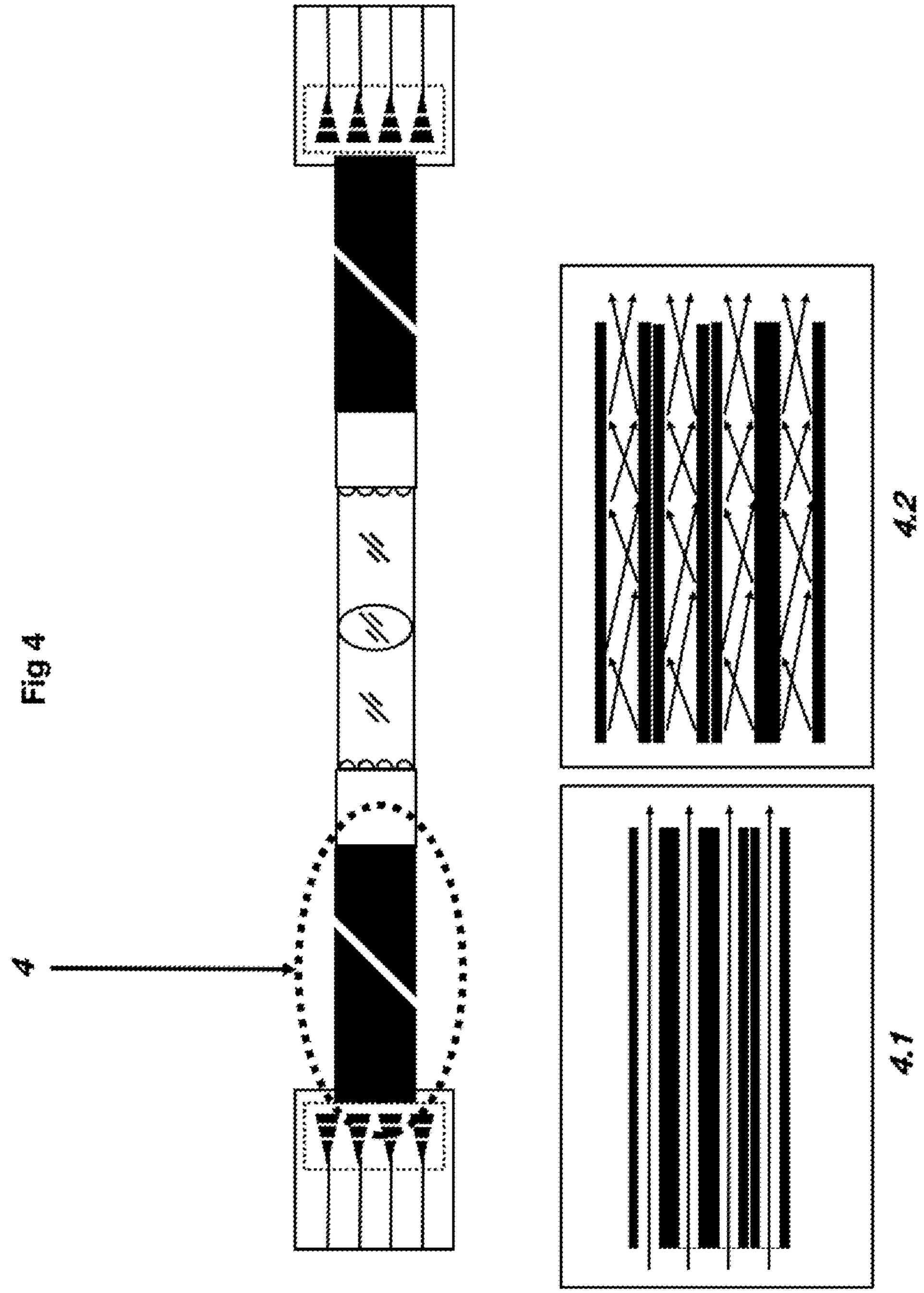
FIG. 4 shows a schematic plan view of the optical processing system of FIG. 1 with detailed views of the fibres in either single mode as in 4.1 or in multi-mode as in FIG. 4.2.

FIG. 4 illustrates in further detail the fibre optic bundles. These may comprise individual fibres, which may be single or multi-mode fibres. Detailed view 4.1. illustrates a single mode optical fibre arrangement whilst detailed view 4.2. shows a multi-mode fibre optic arrangement.

Figure 5:
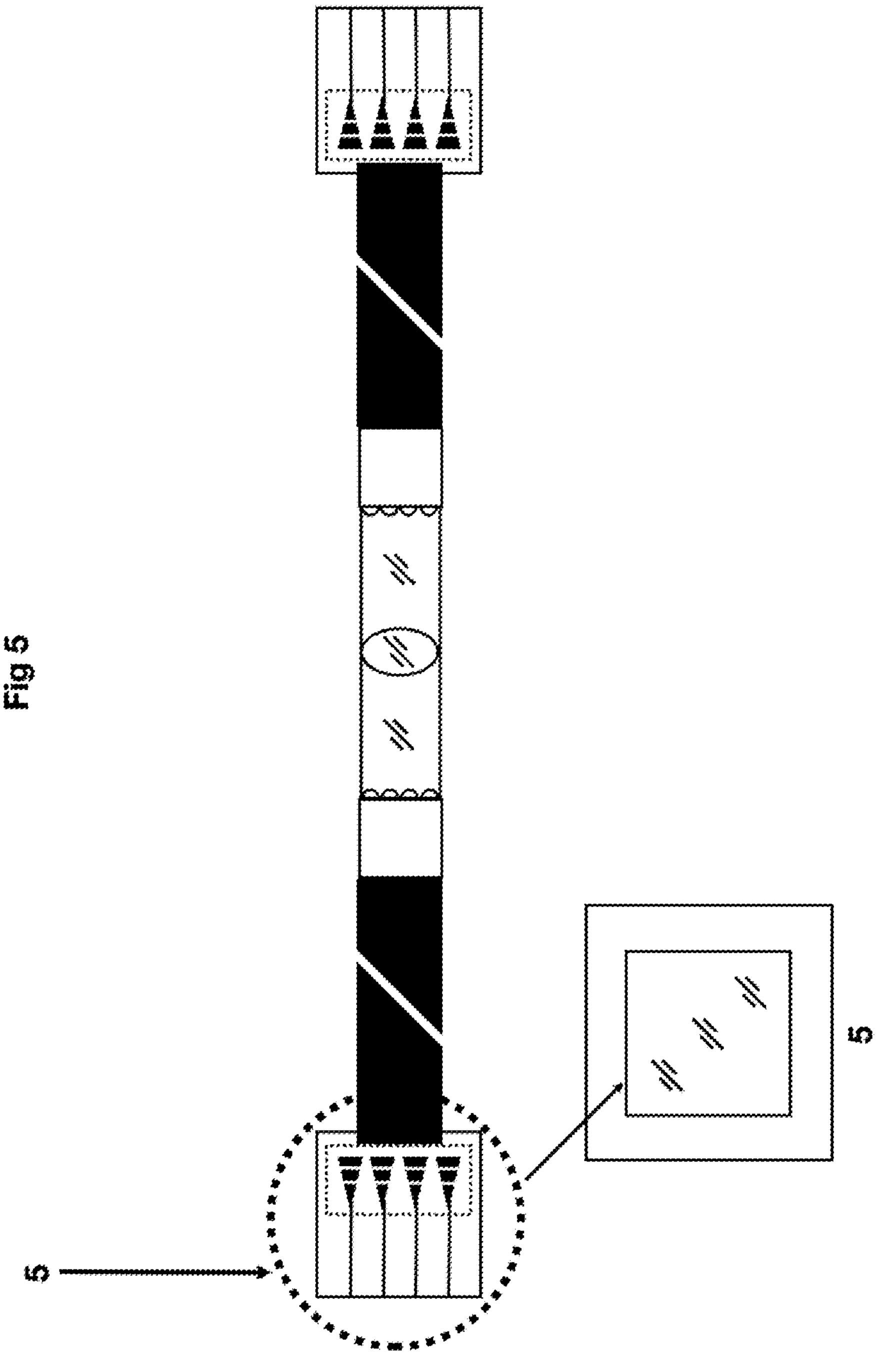
FIG. 5 shows a schematic plan view of the optical processing system of FIG. 1 with a detailed view of the integrated optical waveguide assembly.

FIG. 5 shows a first integrated optical waveguide array, generally referenced 5. In preferred embodiments, the integrated circuit may be a module comprising a photonic integrated circuit ('PIC') including, for example, electro-optic crystals such as lithium niobate, silica on silicon, silicon on insulator.

Figure 6:
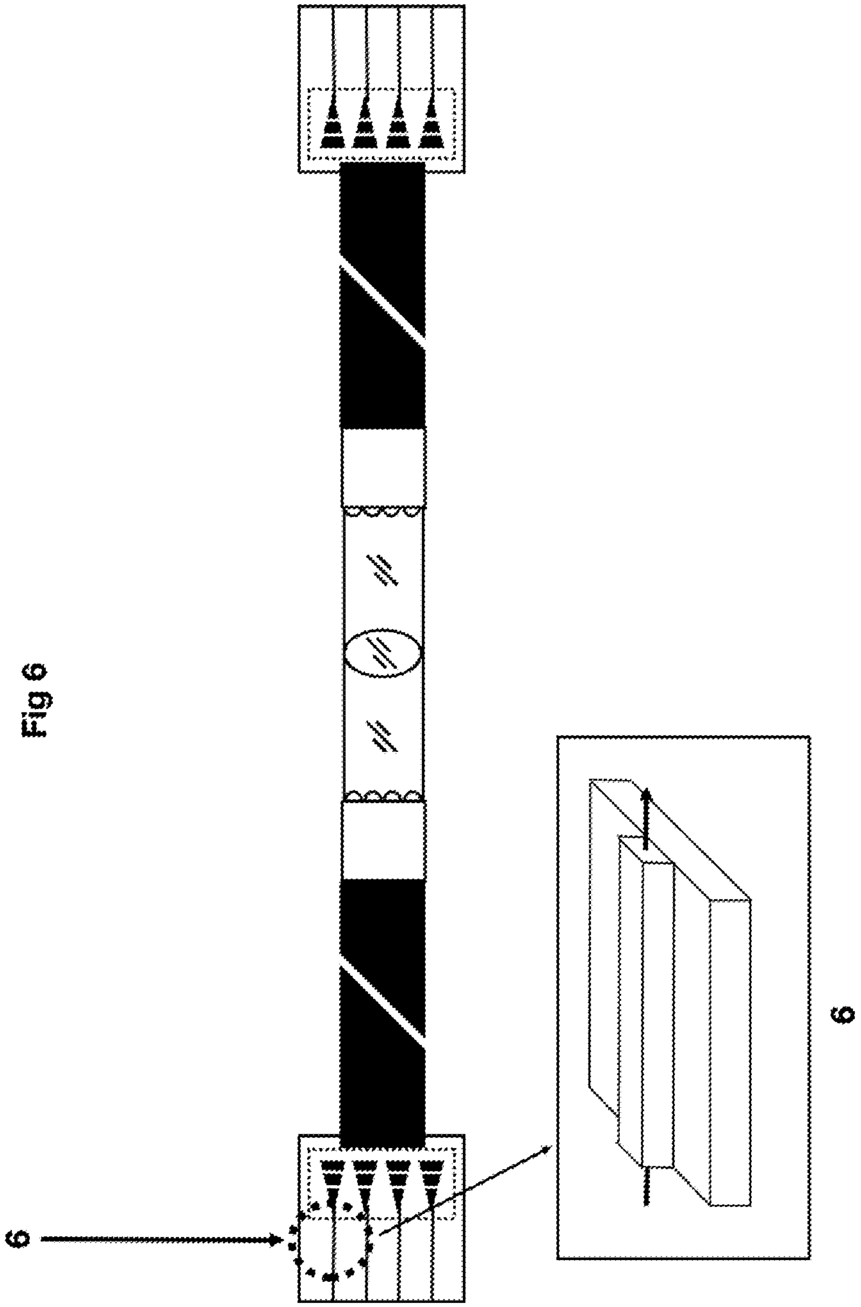
FIG. 6 shows a schematic plan view of the optical processing system of FIG. 1 with a detailed view of an integrated optical waveguide.
Figure 7:
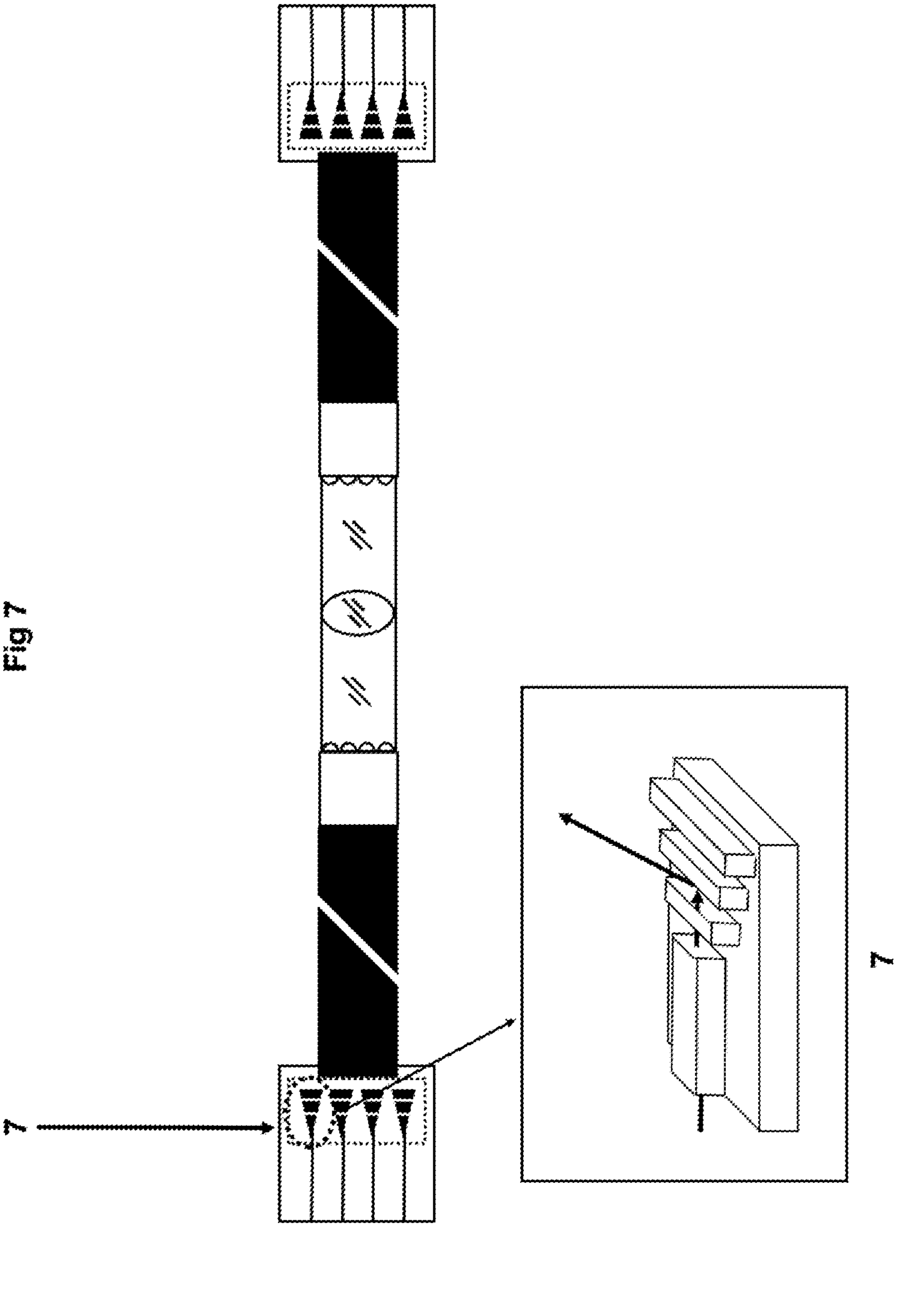
FIG. 7 shows a schematic plan view of the optical processing system of FIG. 1 with a detailed view of a grating coupler.
Figure 8:
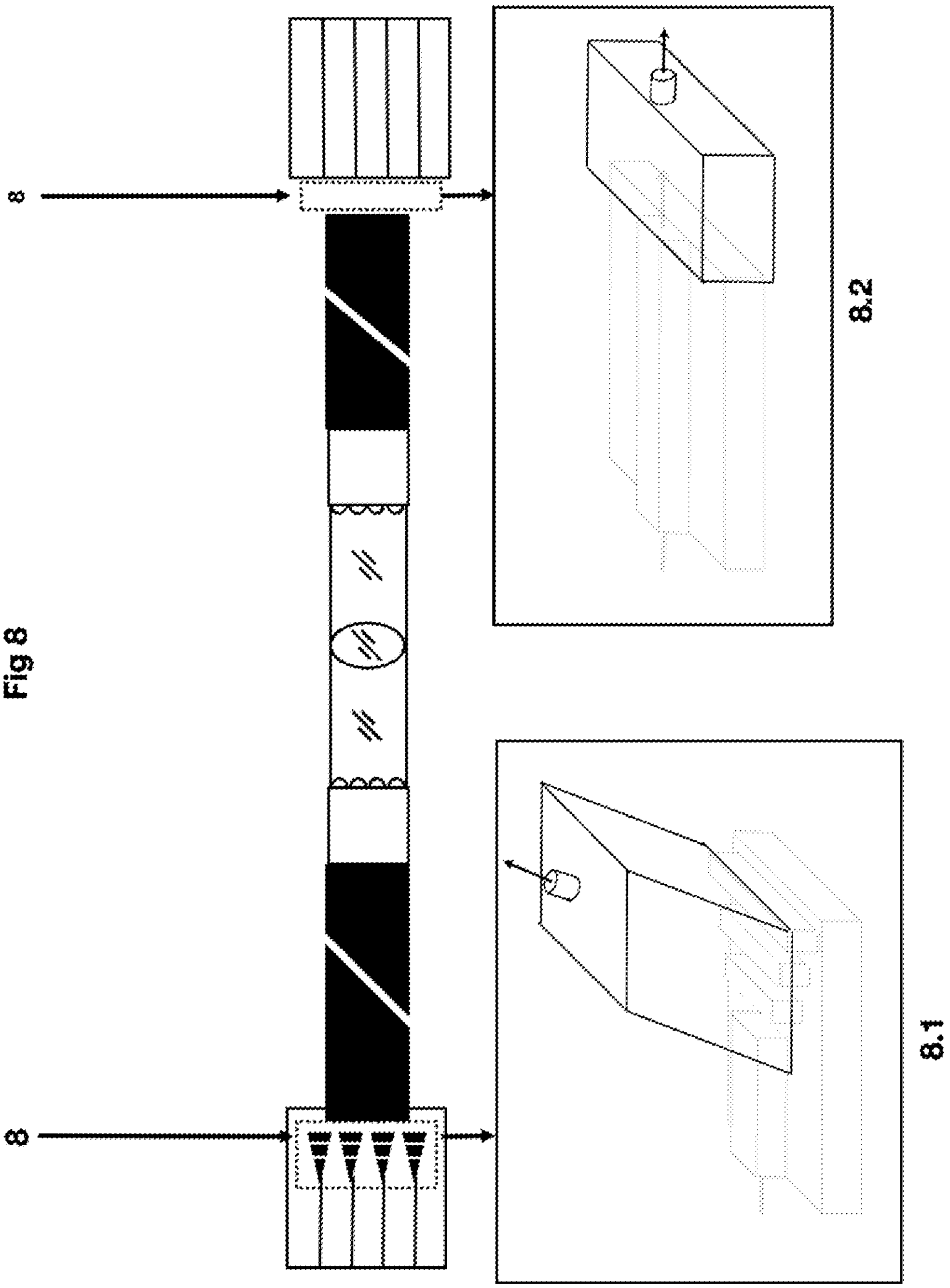
FIG. 8 shows a schematic plan view of the optical processing system of FIG. 1 with a detailed view of fibre couplers.

The photonics integrated circuit 'PIC' comprises a singular or multi waveguide as shown in FIG. 6 and a grating coupler or an endfire coupler as shown in FIGS. 7 and 8 respectively. In use, laser light travels down a singular or multiple waveguides on the photonics integrated circuit 'PIC' and then exits the waveguide into a grating coupler or an endfire.

A fibre coupler 8 as shown in FIG. 8 allows the grating coupler and/or the endfire coupler to couple laser light into the optical fibre bundles which terminate as 1-D or 2-D arrays. The laser light may then travel down the optical fibres of the optical fibre bundles previously described and exit through a 2-D fibre array. The laser light then passes through a microlens array as described in FIG. 2 which collimates the laser light into the optical Fourier transform assembly of FIG. 1. The laser light may then travel through another or a second microlens array as shown in FIG. 2, which focuses the Fourier plane back into another 2-D array, a further fibre bundle is then coupled back into a photonics integrated circuit 'PIC' via couplings of the kind illustrated in FIGS. 7 and 8 respectively.

Figure 9:
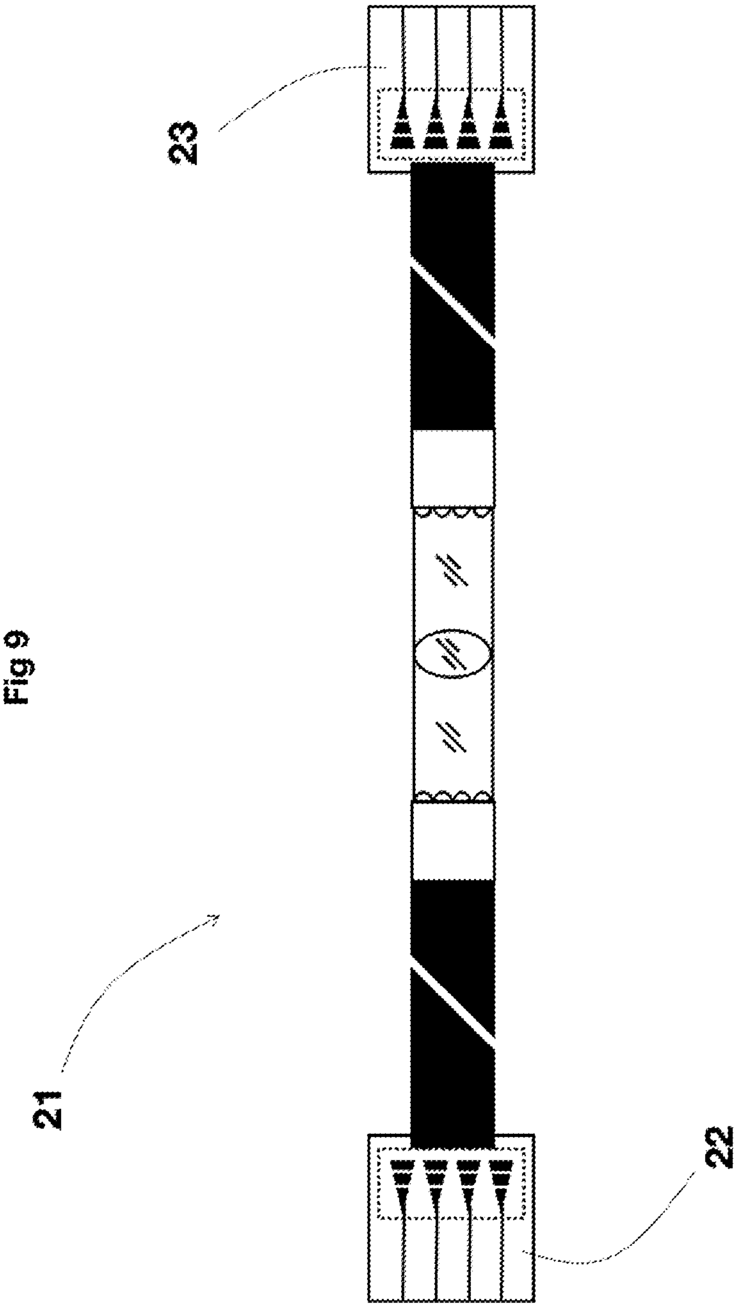
FIG. 9 shows a schematic plan view of the optical processing system of FIG. 1 with both input and output modules possessing grating couplers.

FIG. 9 shows an optical processing system 21 where both the first integrated optical waveguide array 22 and the second integrated optical waveguide array 23 are equipped with grating couplers.

Figure 10:
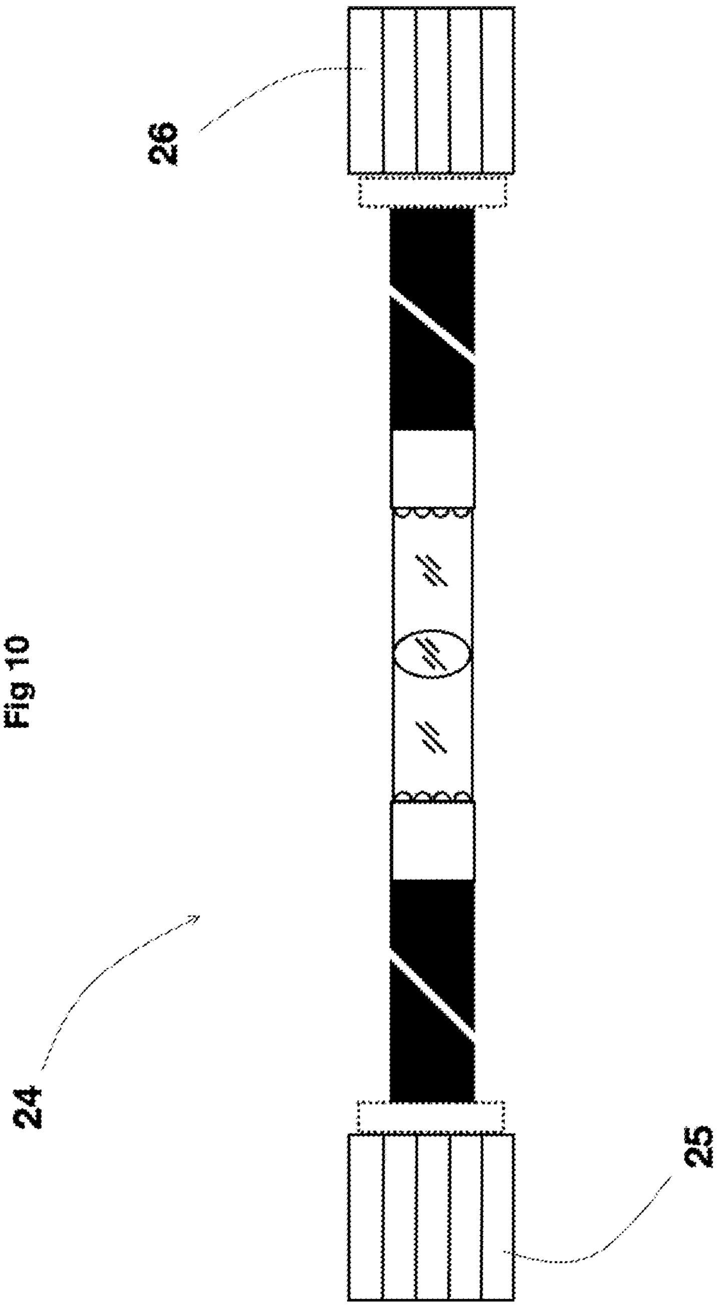
FIG. 10 shows a schematic plan view of an optical processing system with both input and output modules possessing endfire couplers.

FIG. 10 shows an optical processing system 24 where both the first integrated optical waveguide array and the second integrated optical waveguide array are equipped with endfire couplers 25 and 26.

Figure 11:
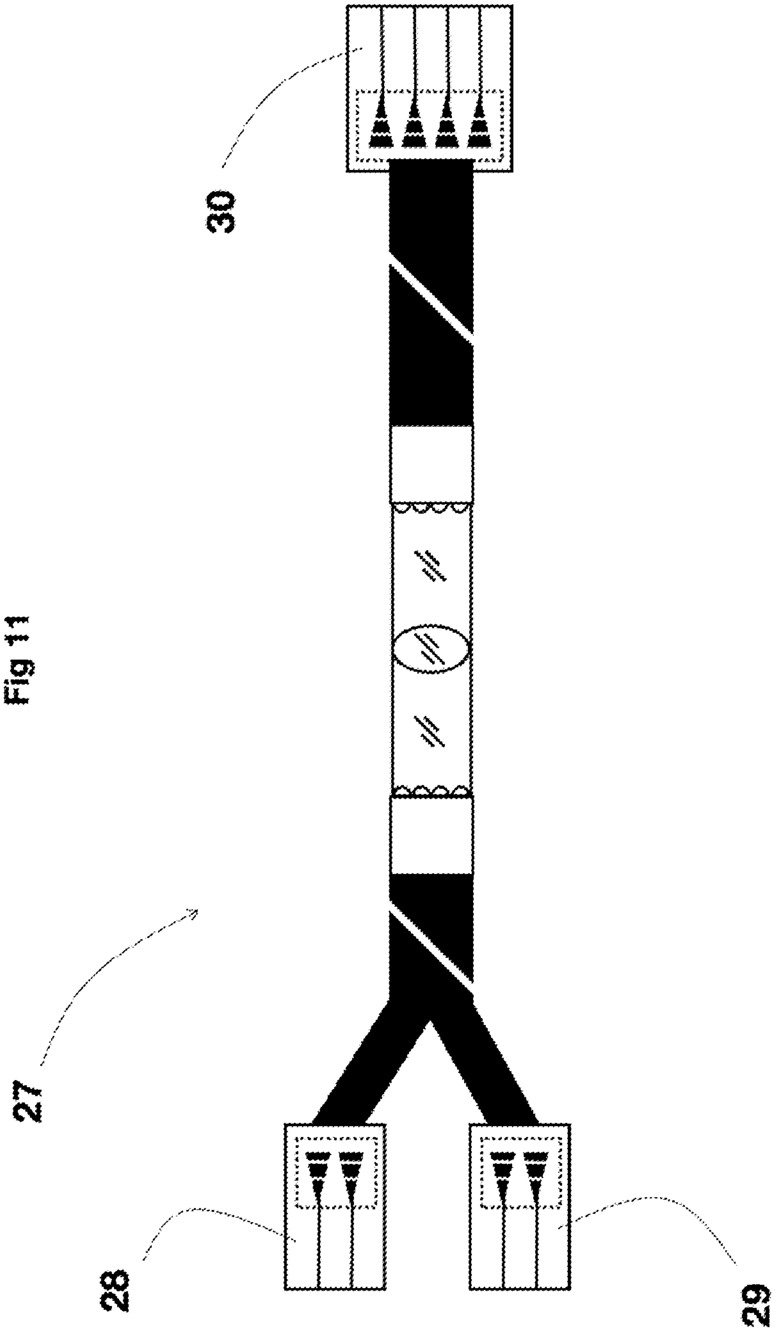
FIG. 11 shows a schematic plan view of an optical processing system with two input grating modules and a single output grating module.

FIG. 11 shows an optical processing system 27 where the first integrated optical waveguide array is provided as a pair of modules 28 and 29 of integrated optical waveguide arrays each with grating couplers. A single module 30 is provided as the output of the optical processing system.

Figure 12:
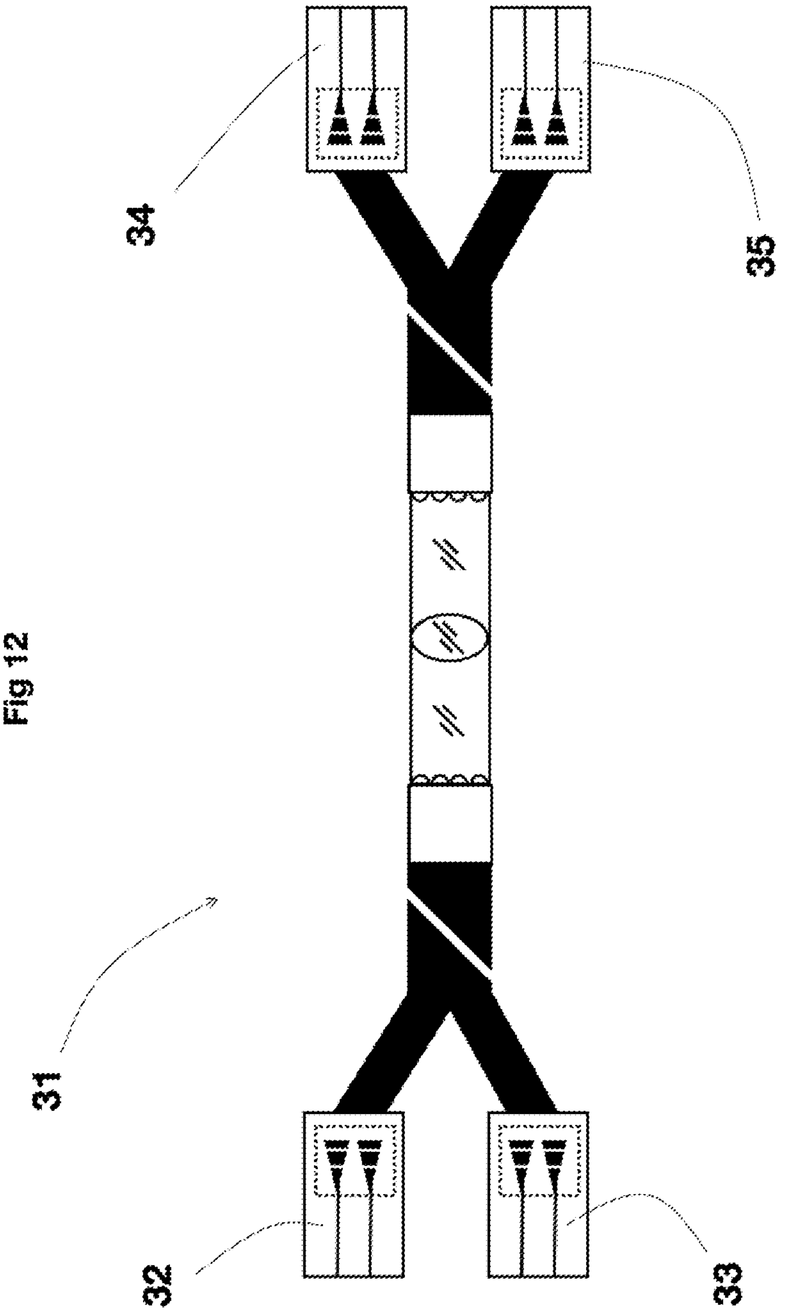
FIG. 12 shows a schematic plan view of an optical processing system with two input grating modules and two output grating modules.

FIG. 12 shows an optical processing system 31 with a pair of input modules 32 and 33 and a pair of output modules 34 and 35. The input and output modules each incorporate integrated optical waveguide arrays and grating couplers.

Figure 13:
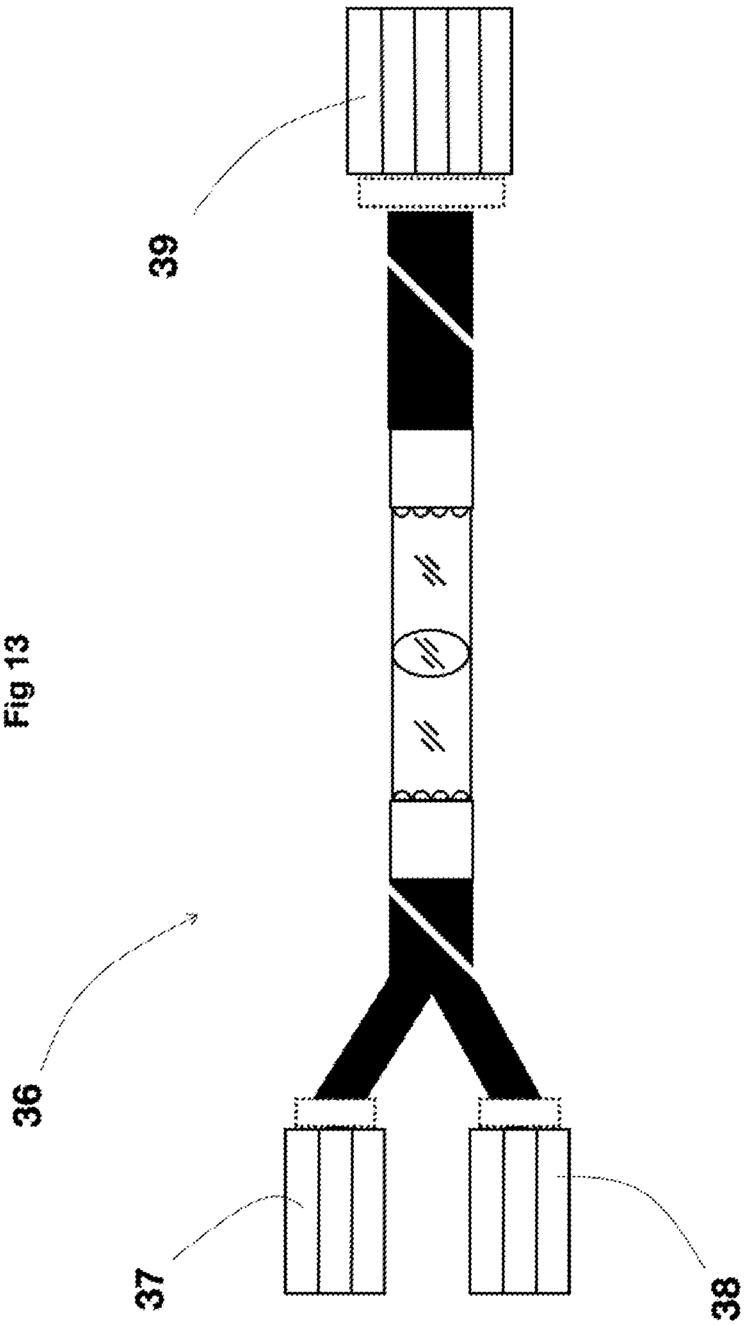
FIG. 13 shows a schematic plan view of an optical processing system with two input endfire modules and a single output endfire modules.

FIG. 13 shows an optical processing system 36 with a pair of integrated optical waveguide array modules 37 and 38, which both incorporate endfire couplers. The optical processing system 36 is equipped with a single endfire integrated optical waveguide array as an output module 39.

Figure 14:
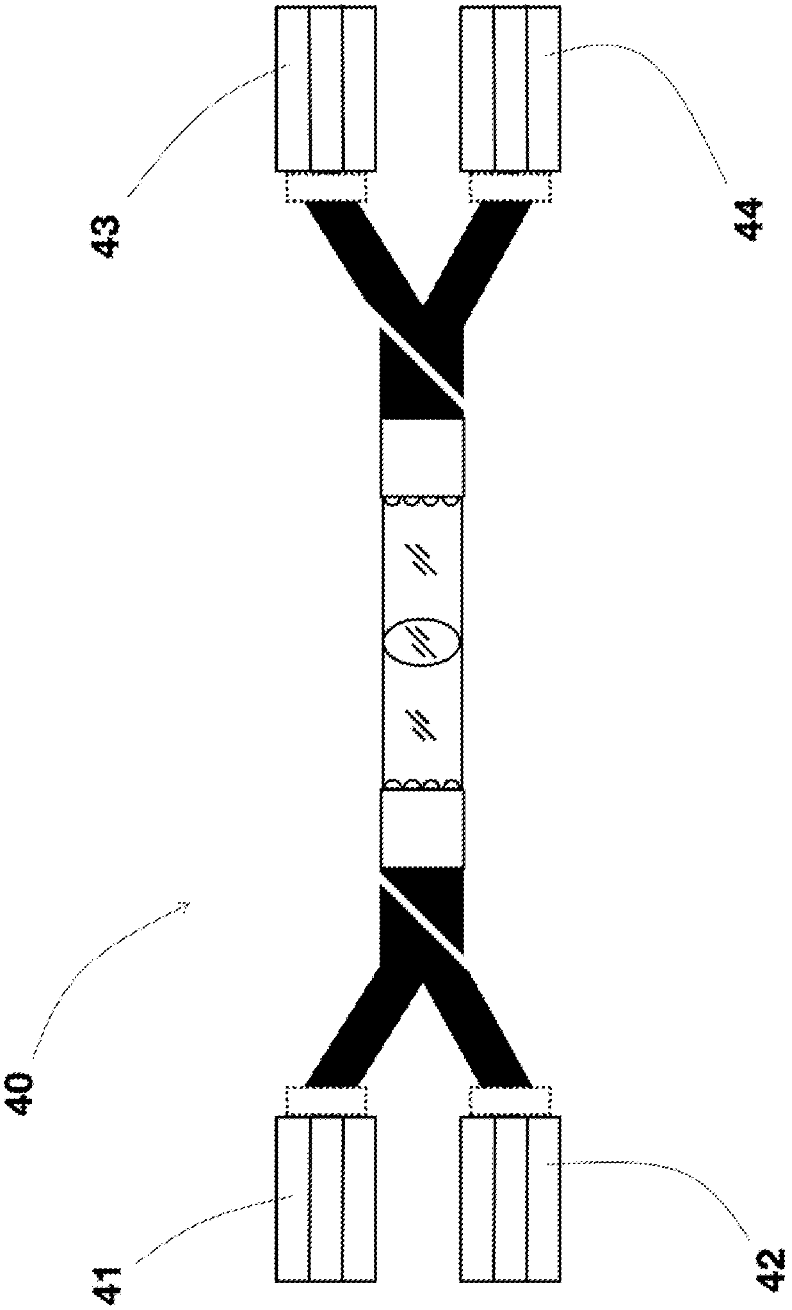
FIG. 14 shows a schematic plan view of an optical processing system with two input endfire modules and two output endfire modules.

FIG. 14 shows a further optical processing system generally referenced 40 where two input modules 41, 42 and two output modules are provided, referenced 43 and 44. Each one of the input and output pairs are equipped with endfire couplers.

Whilst various embodiments have shown a single input module and a single output module as well as the possibility of having several modules as input or outputs, the invention also envisages providing a greater number than two modules for either the input or output. Furthermore, the terms input and output may be interchanged in any of the preceding embodiments. In further embodiments, integrated optical waveguide arrays may for example each be 1-D arrays in order to be able to couple in combination into fibre bundle arrays leading to a lens array which is of a 2-D configuration. This provides optical processing systems with a greater flexibility in order to accommodate an increasing number of modules in order to flexibly increase the capacity of a particular optical processing system. Whilst illustrated modules are each optical systems, it is envisaged that these may be integrated into other modules of the electro-optic kind in order to provide integration of the optical processing system into other processing modules.

The invention claimed is:

1. An optical processing system comprising:
- a first integrated optical waveguide array;
- a first coupler;
- a first bundle of single mode optical fibres coupled to said first integrated optical waveguide array by the first coupler;
- an optical Fourier transform stage coupled to the first bundle of single mode optical fibres;
- a second bundle of single mode optical fibres coupled to said optical Fourier transform stage;
- a second integrated optical waveguide array; and
- a second coupler for coupling said second bundle of single mode optical fibres to said second integrated optical waveguide array,
  - wherein the second bundle of single mode optical fibres is configured to receive light corresponding to a Fourier plane of the optical Fourier transform stage.

2. The optical processing system according to claim 1, wherein at least one of said integrated optical waveguide arrays comprises an array of couplers which are grating couplers.

3. The optical processing system according to claim 2, wherein both said first and second integrated optical waveguide arrays comprise grating couplers.

4. The optical processing system according to claim 1, wherein at least one of said integrated optical waveguide arrays comprises an array of couplers which are endfire couplers.

5. The optical processing system according to claim 4, wherein both said first and second integrated optical waveguide arrays comprise endfire couplers.

6. The optical processing system according to claim 1, wherein at least one of said integrated optical waveguide arrays comprises an array of couplers which are grating couplers whilst at least one of said optical waveguide arrays comprises an array of couplers which are endfire couplers.

7. The optical processing system according to claim 6, wherein said system comprises a plurality of integrated optical waveguide arrays acting as disparate modules for input into the system.

8. The optical processing system according to claim 1, wherein said system comprises a plurality of integrated optical waveguide arrays acting as disparate modules for output from said system.

9. The optical processing system according to claim 1, wherein the Fourier transform stage is a free space optical Fourier stage.

10. The optical processing system according to claim 1, wherein the Fourier transform stage comprises a solid glass single module.

11. The optical processing system according to claim 1, wherein said system comprises a plurality of 1D integrated optical waveguide arrays which couple into an optical fibre bundle which are coupled to a 2D array.

12. The optical processing system according to claim 1, wherein each of said integrated optical waveguide arrays, the first and the second bundles of single mode optical fibres, and the optical Fourier transform stage are formed as disparate modules.

13. The optical processing system according to claim 1, wherein the Fourier transform stage includes free space optics.

14. The optical processing system according to claim 13, wherein the free space optics includes vacuum.

15. The optical processing system according to claim 13, wherein the free space optics includes a fluid.

16. The optical processing system according to claim 13, wherein the free space optics includes glass.

17. An optical processing system comprising:
- a first integrated optical waveguide array;
- a first bundle of optical fibres coupled to the first integrated optical waveguide array by a first coupler and further coupled to an optical Fourier stage;
- a second bundle of optical fibres coupled to the optical Fourier stage;
- a second integrated optical waveguide array; and
- a second coupler for coupling the second bundle of optical fibres to the second integrated optical waveguide array,
- wherein each of the first and the second bundles of optical fibres is coupled to said optical Fourier stage by a respective microlens array.

18. The optical processing system according to claim 17, wherein at least one of the microlens arrays comprises one square microlens, circular microlens, hexagonal microlens, or any combination thereof.

19. The optical processing system according to claim 18, wherein at least one of the microlens arrays has square microlenses on an orthogonal array, circular microlenses on an orthogonal array, circular microlenses on a honeycomb array, hexagonal microlenses on a honeycomb array, or any combination thereof.

* * * * *